United States Patent [19]

Sadler

[11] Patent Number: 5,391,301
[45] Date of Patent: Feb. 21, 1995

[54] METHOD OF REGENERATING RESIN BEADS FOR USE IN WATER PURIFICATION

[75] Inventor: Michael A. Sadler, Bristol, England

[73] Assignee: Northern Engineering Industries plc, Derby, England

[21] Appl. No.: 133,344

[22] Filed: Oct. 8, 1993

[30] Foreign Application Priority Data

Oct. 17, 1992 [GB] United Kingdom ........... 9221947

[51] Int. Cl.⁶ ............................................. C02F 1/42
[52] U.S. Cl. .................................. 210/675; 210/686; 521/26
[58] Field of Search .................... 210/675, 686; 521/26

[56] References Cited

U.S. PATENT DOCUMENTS

| | | | |
|---|---|---|---|
| 3,582,504 | 6/1971 | Salem et al. | 210/686 |
| 3,826,761 | 7/1974 | Short | 210/686 |
| 4,298,696 | 11/1981 | Emmett | 521/26 |
| 4,663,051 | 5/1987 | Flynn et al. | 210/675 |
| 5,212,205 | 5/1993 | O'Brien | 521/26 |

FOREIGN PATENT DOCUMENTS

| | | |
|---|---|---|
| 878608 | 5/1980 | Belgium . |
| 2358192 | 10/1978 | France . |
| 2027610 | 2/1980 | United Kingdom . |
| 1562147 | 3/1980 | United Kingdom . |
| 2117264 | 10/1983 | United Kingdom . |

OTHER PUBLICATIONS

Patent Abstracts of Japan vol. 41, No. 78 JP-A-55 119 446 (EBARA) abstract.

*Primary Examiner*—Ivars Cintins
*Attorney, Agent, or Firm*—Cushman, Darby & Cushman

[57] ABSTRACT

Water is purified to reduce pollution to less than 0.3%, by mixing re-generated and non re-generated anion and cation resins, followed by appropriate final mixing of both when re-generated, for further use.

1 Claim, 1 Drawing Sheet

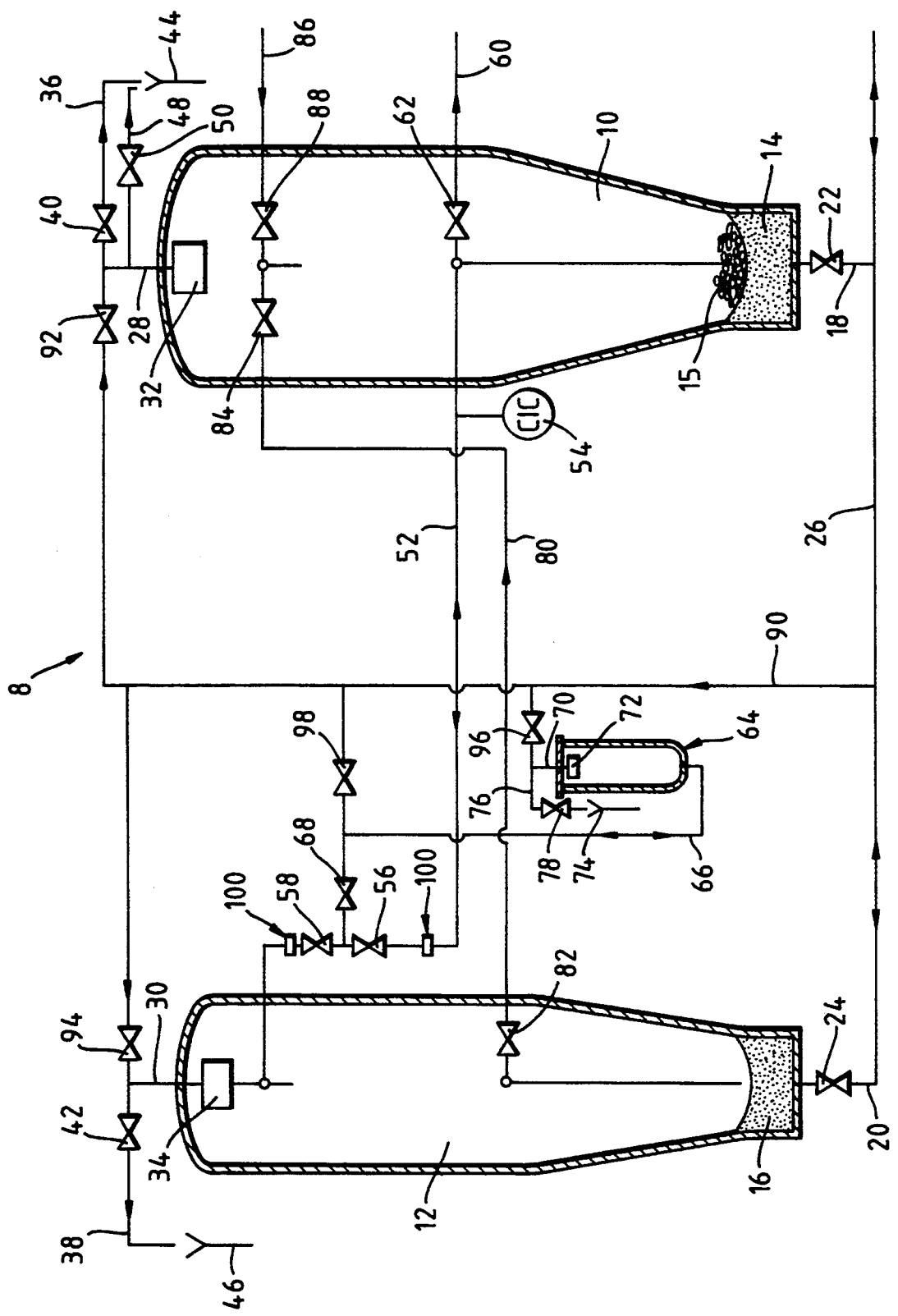

METHOD OF REGENERATING RESIN BEADS FOR USE IN WATER PURIFICATION

The present invention relates to the regeneration of anion and cation resin beads which have become contaminated as a result of being subjected to a flow contaminated water.

BACKGROUND OF THE INVENTION

It is well known to regenerate the abovementioned resin beads by separating them by hydraulic action and then treating the anion resin beads with sodium hydroxide and treating the cation resin beads with sulphuric acid or hydrochloric acid. The two types are then re-mixed and held in a vessel ready for re-use.

The present state of practised art is exemplified in British patents GB2027610B, GB2094174B and GB2117264B, all of which are owned by the applicant for a patent for the present invention.

The efficiency of the inventions described and claimed in the above mentioned patents is such that resin beads that have been regenerated thereby reduce the contamination in water to less than 0.3%. However, even higher standards of water purity are now needed so as to enable its use in the semi conductor chip industry. Thus the present invention seeks to provide an improved method of regenerating anion and cation resins for re-use in the purification of water.

SUMMARY OF THE INVENTION

According to the present invention a method of regenerating anion and cation resin beads comprises the steps of:

(a) providing a first vessel with a quantity of regenerated anion resin beads, (b) adding thereto a mix of unregenerated mix of anion and cation resin beads, the quantity of the former being greater than the quantity of anion beads already in said first vessel, (c) separating therefrom the cation beads and those beads of both kinds which form an interfacial mix between the anion and cation beads, into respective second and third vessels, (d) regenerating the anion resin beads by soaking in sodium hydroxide in liquid form, (e) re-combining the regenerated anion resin beads with the unregenerated cation resin beads and mixing them (f) re-separating and returning the unregenerated cation resin beads to said second vessel, (g) re-generating the cation resin beads by immersing them in hydrochloric acid or sulphuric acid, (h) transferring that volume of regenerated anion resin beads which would normally be used with the given volume cation beads to a fourth vessel, (i) re-mixing the regenerated cation resin beads with the reduced volume of regenerated anion resin beads left in the first vessel and leaving the mix to stand for a predetermined time, (j) re-separating the regenerated cation resin beads and returning them to the second vessel and transferring the reduced volume of regenerated anion resin beads and interfacial mix to the third vessel, (k) re-combining the main volume of regenerated anion resin beads with the regenerated cation resin beads in the first vessel and transferring the resulting mix to a fourth vessel, and (l) returning all of the beads in the third vessel to the first vessel in preparation for receipt again of the main anion/cation mix after its further use in the purification of a flow of water.

BRIEF DESCRIPTION OF THE DRAWING

The invention will now be described by way of example and with reference to the accompanying drawing, which is a diagrammatic representation of apparatus which enables the method of the present invention to be performed.

DETAILED DESCRIPTION OF THE INVENTION

Referring to the drawing. Apparatus for regenerating anion and cation resin beads and which is generally indicated by the numeral 8 has a first separator and anion regeneration vessel 10 and a second cation regeneration vessel 12. The vessels 10 and 12 have respective perforate barriers 14 and 16, consisting of epoxy resin bonded sand for example, in their bases. The barriers 14, 16 permit the passage of liquid while retaining ion exchange materials thereon. The vessels 10 and 12 are connected at their lower ends below the respective barriers 14 and 16 to a drain and to a supply of mixed-bed quality deionised water via respective inlet/outlet pipes 18 and 20 flow through which is controlled by valves 22 and 24, respectively. The water supply pipe 26 is shown but the drain connection is not shown.

The vessels 10 and 12 have respective inlet/outlet pipes 28 and 30 at their upper ends. The pipes 28 and 30 have respective strainers 32 and 34 at their ends in the vessels. The ends of the pipes 28 and 30 outside the vessels are connected respectively to pipes 36 and 38, flow through which is controlled by valves 40 and 42, which lead to drain at 44 and 46. A further pipe 48, flow through which is controlled by a valve 50, additionally connects the pipe 28 to the drain at 44 for a purpose to be described below.

A transfer conduit 52 has an inlet in the vessel 10 adjacent the barrier 14 and an outlet in the vessel 12 above the barrier 16. A detector in the form of a conductivity cell 54 is located in the same conduit 52. Flow through the conduit 52 is controlled by valve means in the form of two valves 56 and 58.

A pipe 60, flow through which is controlled by a valve 62, is connected to the conduit 52 between the valve 56 and the vessel 10 for the transfer of materials from the vessel 10 to a storage or service unit (not shown).

The conduit 52 is connected to the base of a third isolation vessel 64 by a pipe 66 flow through which is controlled by a valve 68. The pipe 66 is connected to the conduit 52 at a position intermediate the valves 56 and 58, which are close together.

The isolation vessel 64 has an inlet/outlet pipe 70 which has a strainer 72 at its end in the vessel 64 and is connected to drain at 74 by a pipe 76, flow through which is controlled by a valve 78, at its end outside of the vessel 64.

A second transfer conduit 80 has an inlet in the vessel 12 adjacent the barrier 16 and an outlet in the vessel 10 above the barrier 14. Flow through the conduit 80 is controlled by valve means in the form of two valves 82 and 84. A pipe 86, flow through which is controlled by a valve 88, is connected to the conduit 80 between the valve 84 and the vessel 10 for the transfer of materials to the vessel 10 from a service unit (not shown).

The water supply pipe 26 is connected by a pipe 90, which has several branches, to the ends of the pipes 28,30 and 70 which are external to their respective vessels and to the pipe 66 between the vessel 64 and the valve 68. Flow of water from the pipe 26 through the branches of the pipe 90 is controlled by valves 92, 94, 96 and 98 respectively.

Other pipework, for example for air supply, venting and regenerant supply, has been omitted to simplify the figure.

A quantity of regenerated anion resin beads 15 resides in the first vessel 10. That quantity is over and above the total amount required relative to a given amount of cation resin beads for a given operation.

Mixed anion and cation ion exchange materials (not shown) which are to be regenerated are transferred from a service unit (not shown) for example a condensate polisher, to the vessel 10 through the pipe 86, the valve 88 and the extreme end of the conduit 80, the valve 84 being closed. The vessel 10 then holds an excess of anion beads, some of which have been regenerated, the remainder to be prepared for regeneration, as are the cation beads.

Air and water are introduced into the vessel 10 through pipe 18 to subject the materials to a preliminary air scouring and backwashing operation to remove dirt. Following the backwashing step, a controlled flow of water is introduced into the vessel 10 through pipe 18 to classify the materials into a upper anion material layer, an inter-facial region consisting of a mixture of anion and cation materials and a lower cation material layer. Water leaves the vessel 10 through the pipe 28 and the valve 40 and goes to drain 44 through the pipe 36. Preferably, the controlled flow is relatively high for an initial period and is then reduced to a smaller flow for the remaining period during which classification of the materials occurs. Typically, the flow rates are selected to give velocities in the parallel-sided portion of the vessel 10 of the order of 12 meters/hour (m/h) and 8 m/h respectively.

Once classification is complete, the flow of water into the vessel 10 is adjusted to a flow rate suitable for transferring material from the vessel 10. Valve 40 is closed and valves 56 and 58 are opened and cation material is hydraulically transferred from vessel 10 through the conduit 52 to the vessel 12. The vessel 10 is maintained full of water during transfer so that, as the level of the top of the anion layer descends, water flows up through the materials to make up the volume of material as it leaves the vessel. Thus, a classifying flow is maintained during transfer. As transfer of cation material from the vessel 10 is nearly completed, the rate of transfer is preferably slowed down by opening the valve 50 so that water flows out of the vessel 10 through the control valve 50 and the flow through the conduit 52 is reduced to a low rate.

As the transfer proceeds, the conductivity cell 54 detects an interface between materials. In this instance, the interface is between relatively pure cation material and relatively pure anion material and is substantially co-extensive with the interfacial region. The interface is detected by a fall in conductivity as material from the interfacial region passes the cell 54. Alternatively the interface between materials can be detected by an optical sensor or a combination of conductivity and optical sensors.

In response to the detection of the interface by the cell 54, the valve 68 is closed, after a suitable timed delay, to isolate the inlet from the outlet of the conduit 52 to leave substantially pure cation material only downstream of the valve 58. As the materials differ in colour, the conduit 52 can be provided with windows 100, for example, so that an operator can determine (or subsequently check) what the delay period should be by visually checking in the windows when the material type in the conduit 52 changes following detection of an interface by the cell 54. At the same time that valve 58 is closed, valve 68 is opened so that continued transfer of materials from the vessel 10 causes materials from the interfacial region to flow through pipe 66 into the isolation vessel 64. After a suitable timed interval, during which substantially all the materials from the interfacial region are passed to the vessel 64, the valves 50 and 56 are closed and the flow of water into the vessel 10 is stopped by closing valve 22.

The valves 56, 68, 98 and then 958, 68 and 98 are operated to allow water to flow from the pipe 26 to flush the relatively pure anion material and relatively pure cation material from the conduit 52 into the respective vessels 10 and 12.

The materials in each vessel 10 and 12 are then subjected to a main air scouring and backwashing operation. This is followed by regeneration of the anion material in vessel 10 using suitable regenerants. Regeneration can involve the preliminary treatment of the resin with a polyvalent regenerant such as sodium carbonate, although others are known, followed by sodium hydroxide solution. Alternatively, at the discretion of the operator, regeneration with only sodium hydroxide solution can be employed. It is known to be beneficial to allow resins to soak overnight, say 12 hours, in the sodium hydroxide regenerant. Such a soaking stage clearly adds time to the regeneration procedure and, whilst beneficial, is not an essential part of the procedure.

After regeneration the anion resin is rinsed free of the regenerant solution. It is known to be beneficial to first rinse the resins to the desired conductivity endpoint and then allow them to soak overnight, say 12 hours, in deionised water and then to rinse again to the desired endpoint. Such a soaking stage clearly adds time to the regeneration procedure and, whilst beneficial, is not an essential part of the procedure.

Following regeneration of the anion resin the unregenerated cation material is transferred from the vessel 12 to the vessel 10 through conduit 80 by introducing a transfer flow of water into the vessel 12 through pipes 20 and 30 and opening valves 82 and 84. Once transfer of the cation material has been completed the unregenerated cation and regenerated anion materials are mixed in the vessel 10 and allowed to stand for a period of time, say 3 hours.

A controlled flow of water is introduced into vessel 10 through pipe 18 to classify the materials into an upper regenerated anion material layer, an inter-facial region consisting of a mixture of regenerated anion and unregenerated cation materials and a lower unregenerated cation material layer. Water leaves the vessel 10 through the pipe 28 and the valve 40 and goes to drain 44 through the pipe 36. Preferably, the controlled flow is relatively high for an initial period and is then reduced to a smaller flow for the remaining period during which classification of the materials occurs. Typically, the flow rates are selected to give velocities in the parallel-sided portion of the vessel 10 of the order of 12 meters/hour (m/h) and 8 m/h respectively.

Once classification is complete, the flow of water into the vessel 10 is adjusted to a flow rate suitable for transferring material from the vessel 10. Valve 40 is closed and valves 56 and 58 are opened and cation material is hydraulically transferred from vessel 10 through the conduit 52 to the vessel 12. The vessel 10 is maintained full of water during transfer so that, as the level of the top of the regenerated anion layer descends, water flows up through the materials to make up the volume of material as it leaves the vessel. Thus, a classifying flow is maintained during transfer. As transfer of unregenerated cation material from the vessel 10 is nearly completed, the rate of transfer is preferably slowed down by opening the valve 50 so that the water flows out of the vessel 10 through the control valve 50 and the flow through the conduit 52 is reduced to a low rate.

As the transfer proceeds, the conductivity cell 54 detects an interface between materials. In this instance, the interface is between relatively pure unregenerated cation material and relatively pure regenerated anion material and is substantially co-extensive with the interfacial region. The interface is detected by a fall in conductivity as material from the interfacial region passes the cell 54. Alternatively the interface between materials can be detected by an optical sensor or a combination of conductivity and optical sensors.

In response to the detection of the interface by the cell 54, the valve 58 is closed, after a suitable timed delay, to isolate the inlet from the outlet of the conduit 52 to leave substantially pure unregenerated cation material only downstream of the valve 58. As the materials differ in colour, the conduit 52 can be provided with windows 100, for example, so that an operator can determine (or subsequently check) what the delay period should be by visually checking in the windows when the material type in the conduit 52 changes following detection of an interface by the cell 54. At the same time that valve 58 is closed, valve 68 is opened so that continued transfer of materials from the vessel 10 causes materials from the interfacial region to flow through pipe 66 into the isolation vessel 64. After a suitable timed interval, during which substantially all the materials from the interfacial region are passed to the vessel 64, the valves 50 and 56 are closed and the flow of water into the vessel 10 is stopped by closing valve 22.

The valves 56, 68 and 98 and then 58, 68 and 98 are operated to allow water to flow from the pipe 26 to flush the relatively pure regenerated anion material and relatively pure unregenerated cation material from the conduit 52 into the respective vessels 10 and 12.

The cation exchange resin in vessel 12 is then regenerated. Regeneration can involve the preliminary treatment of the resin with a polyvalent regenerant such as a solution of diaminopropane or diaminoethane although suitable regenerants are known. This is followed by regeneration with a solution of sulphuric or hydrochloric acid. Alternatively at the discretion of the operator, regeneration with only a solution of sulphuric acid or hydrochloric acid can be employed. It is known to be beneficial to allow resins to soak overnight, say hours, in the sulphuric or hydrochloric acid regenerant. Such a soaking stage clearly adds time to the regeneration procedure and, whilst beneficial, is not an essential part of the procedure.

After regeneration the cation resin is rinsed free of the regenerant solution. It is known to be beneficial to first rinse the resins to the desired conductivity endpoint and then allow them to soak overnight, say 12 hours, in deionised water and then to rinse again to the desired endpoint. Such a soaking stage clearly adds time to the regeneration procedure and, whilst beneficial, is not an essential part of the procedure.

Part of the regenerated, purified and rinsed regenerated anion resin beads in vessel 10 is transferred to a fourth storage vessel (not shown but which may be the first mentioned storage unit or a further vessel) through conduit 52 and pipe 60 by introducing a transfer flow of water into the vessel through pipes 18 and 28 and opening the appropriate valves. The volume of anion resin beds remaining in vessel 10 should be approximately 25% of the volume of the cation resin used in a normal mixed bed charge. The volume of anion resin transferred should be that used in a normal mixed bed charge. Thus the volume of anion resin beads in the regeneration system is about 25% greater than is needed for water purification.

The regenerated and rinsed cation resin is transferred from vessel 12 into vessel 10 through conduit 80 by introducing a transfer flow of water into vessel 12 through pipes 20 and 30 and opening valves 82 and 84. Once the transfer has been completed the regenerated cation and anion materials now in vessel 10 are mixed and allowed to stand, say for 3 hours.

The mixed resins in vessel 10 are now separated.

A backwashing step is then effected, followed by a controlled flow of water into the vessel 10 through pipe 18 to classify the materials into an upper regenerated anion material layer, an interfacial region consisting of a mixture of regenerated anion and regenerated cation materials and a lower, regenerated cation material layer. Water leaves the vessel 10 through the pipe 28 and the valve 40 and goes to drain 44 through the pipe 36. Preferably, the controlled flow is relatively high for an initial period and is then reduced to a smaller flow for the remaining period during which classification of the materials occurs. Typically, the flow rates are selected to give velocities in the parallel-sided portion of the vessel 10 of the order of 12 meters/hour (m/h) and 8 m/h respectively.

Once classification is complete, the flow of water into the vessel 10 is adjusted to a flow rate suitable for transferring material from the vessel 10. Valve 40 is closed and valves 56 and 58 are opened and regenerated cation material is hydraulically transferred from vessel 10 through the conduit 52 to the vessel 12. The vessel 10 is maintained full of water during transfer so that, as the level of the top of the regenerated anion layer descends, water flows up through the materials to make up the volume of material as it leaves the vessel. Thus, a classifying flow is maintained during transfer. As transfer of regenerated cation material from the vessel 10 is nearly completed, the rate of transfer is preferably slowed down by opening the valve 50 so that water flows out of the vessel 10 through the control valve 50 and the flow through the conduit 53 is reduced to a low rate.

As the transfer proceeds, the conductivity cell 54 detects an interface between materials. In this instance, the interface is between relatively pure regenerated cation material and relatively pure regenerated anion material and is substantially co-extensive with the interfacial region. The interface is detected by a fall in conductivity as material from the interfacial region passes the cell 54. Alternatively the interface between materials may be detected by optical means, or a combination of conductivity and optical sensors.

In response to the detection of the interface by the cell 54, the valve 58 is closed, after a suitable timed delay, to isolate the inlet from the outlet of the conduit 52 to leave substantially pure regenerated cation material only downstream of the valve 58. As the materials differ in colour, the conduit 52 can be provided with windows 100, for example, so that an operator can determine (or subsequently check) what the delay period should be by visually checking in the windows when the material type in the conduit 52 changes following detection of an interface by the cell 54. At the same time that valve 58 is closed, valve 68 is opened so that continued transfer of materials from the vessel 10 causes all the remaining materials from the vessel 10 to flow through pipe 66 into the isolation vessel 64. After a suitable timed interval the valves 50 and 56 are closed and the flow of water into the vessel 10 is stopped by closing valve 22.

The valves 68 and then 58 are operated to allow water to flow from the pipe 26 to flush the relatively pure regenerated cation material from the conduit 52 into the vessel 12.

The regenerated, purified and rinsed cation material is transferred from the vessel 12 to vessel 10 through conduit 80 by introducing a transfer flow of water into vessel 12 through pipes 20 and 30 and opening valves 82 and 84.

The regenerated, purified and rinsed anion material is transferred from the storage vessel (not shown) by introducing a transfer flow of water into the storage vessel and transferring the anion material through conduit 86 and opening valve 88 and appropriate valves on the storage vessel interconnecting pipework.

When the regenerated, purified and rinsed anion and cation materials have been transferred to vessel 10 they are remixed. They can be held in vessel 10 until required for service or moved to the storage vessel (not shown). In either case they will be rinsed to a very low conductivity before being placed in service.

In either event, when vessel 10 is finally emptied the mixture of materials held in the isolation vessel 64 is transferred to vessel 10 to await the next batch of materials for regeneration. The transfer is accomplished by a flow of water from 26 by closure of the valves 58 and 98 and the opening of the valves 56, 68 and 96. If necessary, following the transfer the conduit 52 is given a final flush with water by closing valve 96 and opening valves 56, 68 and 98.

It will be understood that there can be many variations depending on the actual plant layout on which the process is being used. The process as described does not employ the use of inert resins but these materials can be used to further improve separation efficiencies. Inert material has a density intermediate the densities of anion and cation materials so that an interfacial region is formed on classification and is substantially pure inert resin as described in specification No 2027610B.

The process is equally applicable to other regions of mixed bed regeneration plants. These will not be described in view of the diversity of designs possible but the process detailed in this specification can easily be adapted for use on these plants although on some, changes to pipework and/or provision of extra vessels may be necessary.

I claim:

1. A method of regenerating anion and cation resin beads which have been used in a water purification process using a selected volume of anion and cation resin beads comprising the steps of:
   (a) providing a first vessel with a quantity of regenerated anion resin beads,
   (b) adding thereto a mix of unregenerated anion and cation resin beads, the quantity of the former being greater than the quantity of anion beads already in said first vessel,
   (c) separating therefrom the cation beads and said cation and anion beads which form an interfacial mix between the anion and cation beads, into respective second and third vessels,
   (d) regenerating the anion resin beads by soaking in sodium hydroxide in liquid form,
   (e) re-combining the regenerated anion resin beads with the unregenerated cation resin beads and mixing them
   (f) re-separating and returning the unregenerated cation resin beads to said second vessel,
   (g) regenerating the cation resin beads by immersing them in hydrochloric acid or sulphuric acid,
   (h) transferring a selected volume of regenerated anion resin beads to a fourth vessel, said selected volume corresponding to the selected volume of cation resin beads that are used in the purification process,
   (i) re-mixing the regenerated cation resin beads with the reduced volume of regenerated anion resin beads left in the first vessel and leaving the mix to stand for a predetermined time,
   (j) re-separating the regenerated cation resin beads and returning them to the second vessel and transferring the reduced volume of regenerated anion resin beads and interfacial mix to the third vessel,
   (k) re-combining the regenerated anion resin beads with the regenerated cation resin beads in the first vessel and transferring the resulting mix to a fourth vessel, and
   (l) returning all of the beads in the third vessel to the first vessel prior to receiving an additional mix of unregenerated anion and cation resin beads.

* * * * *